(12) United States Patent
Rizzo

(10) Patent No.: US 6,439,159 B1
(45) Date of Patent: Aug. 27, 2002

(54) FLUID DRIPPER FOR BIRDS

(76) Inventor: James R. Rizzo, 6 Wetmore Dr., Denville, NJ (US) 07834

( * ) Notice: Subject to any disclaimer, the term of this patent is extended or adjusted under 35 U.S.C. 154(b) by 0 days.

(21) Appl. No.: 09/472,704

(22) Filed: Dec. 27, 1999

(51) Int. Cl.[7] .............................................. A01K 9/00
(52) U.S. Cl. ........................................ 119/72; 119/72.5
(58) Field of Search ............................ 119/72, 72.5, 75, 119/51.01, 51.05, 71, 79, 80, 52.1, 52.2, 74; D30/133

(56) References Cited

U.S. PATENT DOCUMENTS

| | | | | |
|---|---|---|---|---|
| 926,538 A | * | 6/1909 | Bandy | 119/72 |
| 1,174,766 A | * | 3/1916 | Sheuplein | 119/72 |
| 2,570,733 A | * | 10/1951 | Thomas | 119/72 |
| 4,982,699 A | * | 1/1991 | Momont | 119/72.5 |
| 5,195,463 A | * | 3/1993 | Lorenzana et al. | 119/77 |
| D367,737 S | * | 3/1996 | McNaughton et al. | D30/133 |
| D403,131 S | * | 12/1998 | Bowell et al. | D30/133 |
| 5,845,605 A | | 12/1998 | Malamphy | |
| 5,867,929 A | * | 2/1999 | Jung et al. | 47/40.5 |
| 6,079,361 A | * | 6/2000 | Bowell et al. | 119/72 |
| 6,142,100 A | * | 11/2000 | Marchioro | 119/54 |

* cited by examiner

Primary Examiner—Charles T. Jordan
Assistant Examiner—Judith A Nelson
(74) Attorney, Agent, or Firm—Gibbons, Del Deo, Dolan, Griffinger & Vecchione

(57) ABSTRACT

The present invention is an apparatus for dripping fluid to attract birds. The invention comprises a reservoir having an orifice and a tube extending therefrom. A valve is attached to the tube. The reservoir is filled with fluid which in turns passes through the orifice and tube, while the valve regulates the flow rate of the fluid through the tube. The invention has a receptacle beneath the tube to collect the fluid and a hanging mechanism for hanging the invention at the desired location.

1 Claim, 2 Drawing Sheets

FLUID DRIPPER FOR BIRDS

FIELD OF THE INVENTION

The present invention relates generally to devices for attracting birds, and more particularly, to devices for dripping fluid at a constant rate for attracting birds.

BACKGROUND OF THE INVENTION

Bird watchers and enthusiasts are aware that birds are attracted to flowing or dripping fluid, such as water. Thus, in order to attract birds to a particular area, fountains or bird baths are used. Fountains are designed to have a continuously flowing stream of fluid to attract birds to the area. On the other hand, bird baths are typically structures having a pool of fluid.

Both fountains and bird baths are structures typically requiring outdoor plumbing and electrical lines to supply the constantly flowing fluid. The devices are both expensive to build and maintain due to the rather large size of the structure and the need for constantly flowing fluid.

Accordingly, there is a need to provide a simple and cost effective device to attract birds to an area using a constant flow of dripping fluid, such as fluid, without the need for outdoor plumbing or electrical lines.

SUMMARY OF THE INVENTION

The present invention is a device having a constant, regulated flow of fluid for attracting birds. An exemplary embodiment of the present invention comprises a reservoir having an orifice on one end with a tube extending therefrom. A valve is attached to the tube to regulate the flow of fluid. A hanging mechanism is attached to the top end of the reservoir. The hanging mechanism may be adaptable to allow the present invention to hang at any height from a hook or the like. The reservoir is filled with fluid which in turn exits the reservoir through the orifice and drips through the tubing at a rate regulated by the valve. Thus, the valve will allow the fluid to drip from the reservoir for days without the need for plumbing, electrical devices such as a pump, or refilling the reservoir. Birds are attracted to this constantly dripping flow of fluid.

The present invention further comprises a detachable dripping receptacle. The dripping receptacle hangs from the reservoir beneath the tube and catches the fluid as it drips. The present invention may be utilized with or without the dripping receptacle. While used with the dripping receptacle, birds can drink fluid that has accumulated on the dripping receptacle. If the dripping receptacle is detached, the present invention may be hung over other items or structures such as an existing bird bath, fountain, a plant, or nothing at all.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION

Figure 1:
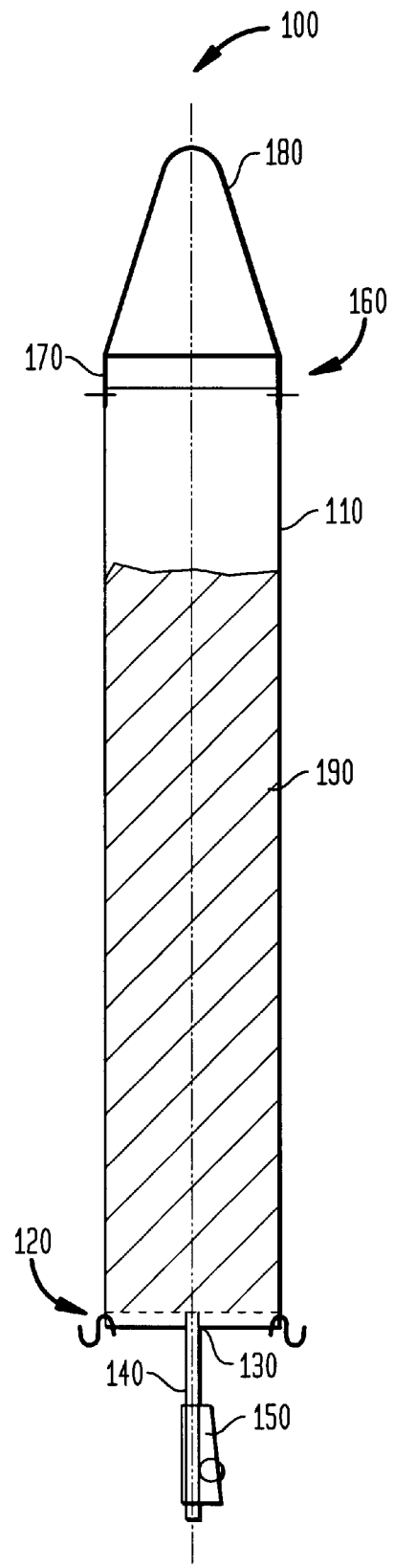
FIG. 1 is a front plan view of a fluid dripper for birds.

The present invention is an apparatus for dripping fluid at a constant rate to attract birds to the area surrounding the invention. Referring to FIG. 1, there is shown an exemplary embodiment of a fluid dripper 100 according to the present invention. The fluid dripper 100 has a reservoir 110, which is shown in a cylindrical shape, but may be various shapes and sizes, for example, cubical, conical, spherical, pyramidal, etc. On a bottom end 120 of the reservoir 100 there is defined an orifice 130 having a tube 140 extending therefrom. Around the tube 140 there is connected a valve. The valve may be any valve which can be adjusted to regulate the drip rate such as the Ramp Tubing Clamp stock number 16004, distributed by U.S. Plastics Corporation, or the Roller Clamp number B0890218, manufactured by Burron OEM. Shown in this exemplary embodiment is roller clamp 150 attached to the tube 140 for regulating a flow of fluid through the tube. In addition, the valve may be a stop cock valve.

On a top end 160 of the reservoir 110 there is a readily detachable lid 170. In addition, at the top end 160, a hanging mechanism 180 is attached. The hanging mechanism 180 may be comprised of rope or wire, or any other type of flexible, thin tubular material.

Figure 2:
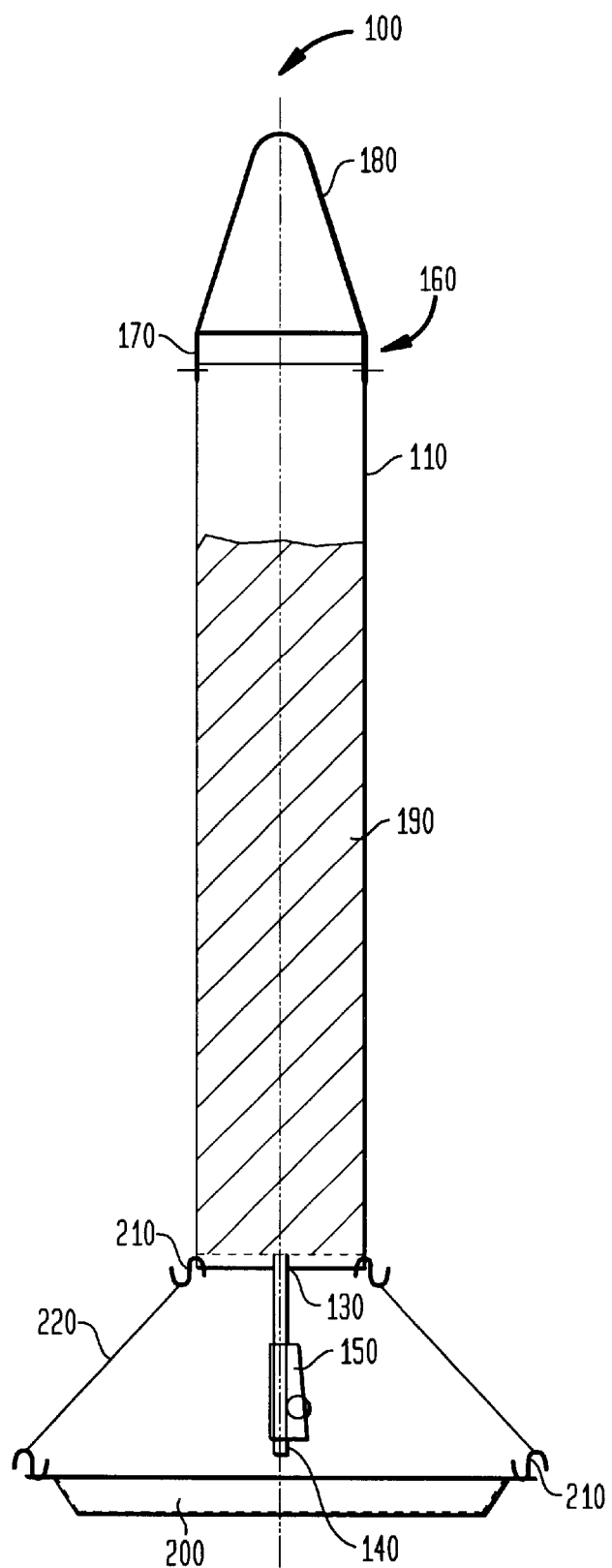
FIG. 2 is a front plan view of another embodiment of a fluid dripper for birds.

FIG. 2 further illustrates the fluid dripper 100 using a dripping receptacle 200. The dripping receptacle 200 is attached to the bottom end 120 of the reservoir 110 by hooks 210 and chains 220. The dripping receptacle 200 may be detached from the reservoir 110 by removing the chains 220.

In operation, the lid 170 is removed from the reservoir 110. The reservoir 110 is filled with fluid 190. The lid 170 is then replaced back on the reservoir 110. The fluid dripper 100 is then placed in its desirable location and secured using the hanging mechanism 180. The fluid dripper 100 may be hung from a hook (not shown), a tree (not shown) or the like. The roller clamp 150 is adjusted to regulate the fluid flow to the desired flow rate. Fluid 190 within the reservoir 110 passes through the orifice 130 and the tube 140. The roller clamp 150 is adjusted to squeeze the tube 140 to alter the cross area of the tube 140, regulating the flow of fluid 190 passing through the tube 140.

If the fluid dripper 100 is used with the drippping receptacle 200, the fluid 190 collects on the dripping receptacle 200 and, thus birds may drink the collected fluid. Birds are attracted to the constant flow of the slowly dripping fluid. The fluid dripper 100 may alternatively be hung without the dripping receptacle 200, as shown in FIG. 1, over a plant (not shown) or over nothing at all.

From the above, it should be understood that the embodiments described, in regard to the drawings, are merely exemplary and that a person skilled in the art may make variations and modifications to the shown embodiments without departing from the spirit and scope of the invention. For example any number of shapes may be used for the reservoir and any number of valves may also be utilized. All such variations and modifications are intended to be included within the scope of the invention as defined in the appended claims.

What is claimed is:

1. An apparatus for attracting birds comprising:

a plastic cylindrical reservoir having a bottom end and a top end, said bottom end defining an orifice;

a readily detachable lid attached at said top end of said reservoir;

a wire attached to said top end of reservoir;

a tube connected to and extending from said orifice;

a roller clamp attached to said tube for regulating a flow of fluid through said tube; and a receptacle hooked to said bottom end of said reservoir by at least two chains;

wherein said lid is removed to fill said reservoir with fluid and said fluid drips from said orifice, through said tube, at a constant rate as regulated by said roller clamp and said receptacle collects said fluid after said fluid passes through said tube.

* * * * *